Jan. 9, 1934.                O. LÖBL                  1,942,481
                    VOLTAGE REGULATING TRANSFORMER
                       Filed June 26, 1931      2 Sheets-Sheet 1
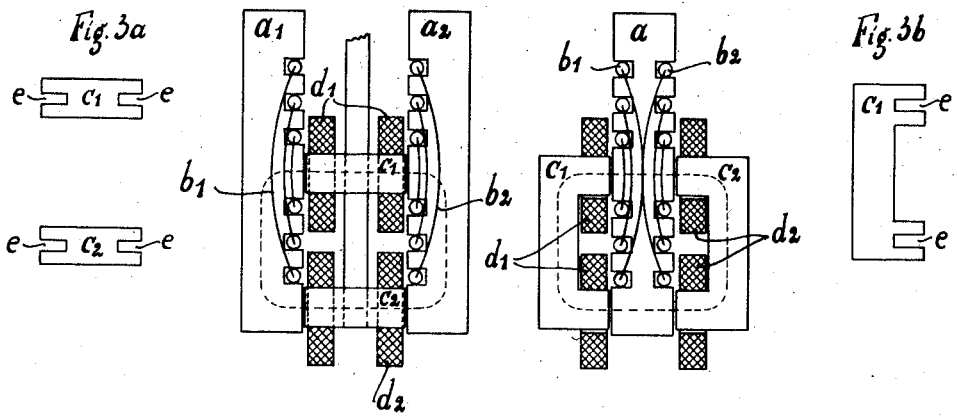
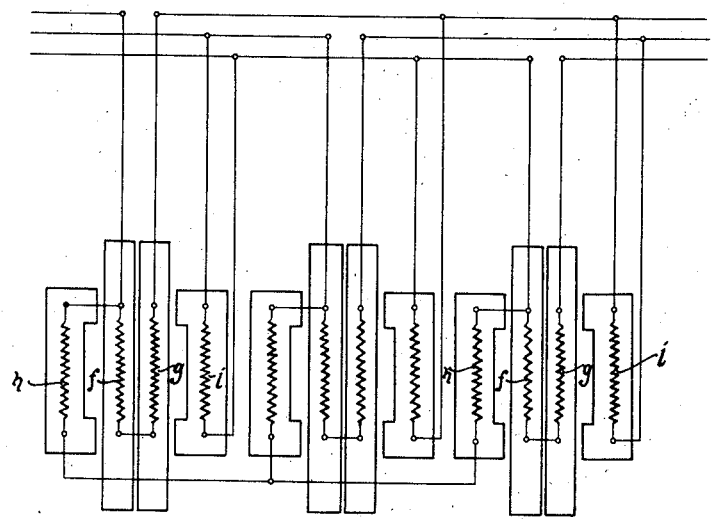
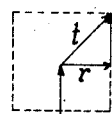
Inventor
Oskar Löbl
by C. P. Goepel
his attorney Jan. 9, 1934.  O. LÖBL  1,942,481

VOLTAGE REGULATING TRANSFORMER

Filed June 26, 1931  2 Sheets-Sheet 2

Inventor
Oskar Löbl
by
his attorney

Patented Jan. 9, 1934

1,942,481

UNITED STATES PATENT OFFICE 1,942,481

VOLTAGE REGULATING TRANSFORMER

Oskar Löbl, Berlin-Hermsdorf, Germany

Application June 26, 1931, Serial No. 547,069, and in Germany July 1, 1930

6 Claims. (Cl. 171—119)

My invention relates to voltage regulating transformers and consists essentially in constructing a novel device of this kind either in the form of a regulating transformer proper having a primary and a secondary winding or in the form of a choke-coil having two systems of windings.

My invention, more particularly, has for its general object to provide a transformer or choke-coil for the regulation of the voltage of alternating currents without employing any rotary motion to effect displacement of two systems of windings. For this purpose my novel regulating device, irrespective of the fact whether it is constructed in the form of a transformer proper or in the form of a choke-coil, comprises two systems of core members which form an approximately closed magnetic circuit and permit displacement relatively to each other by a sliding motion along a straight line.

Figure 5:
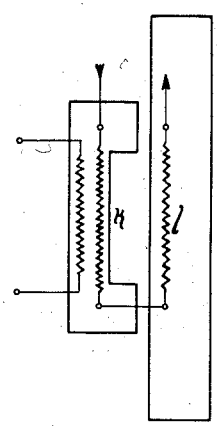
Figure 6:
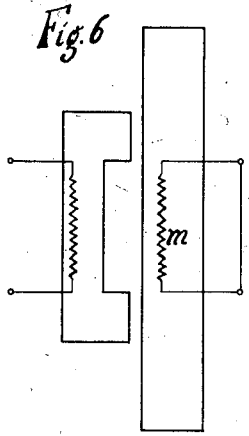
Figure 7:
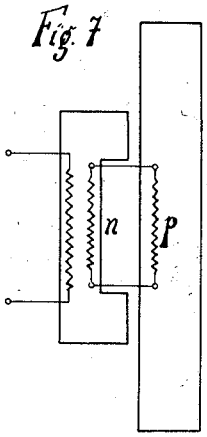
Figure 8:
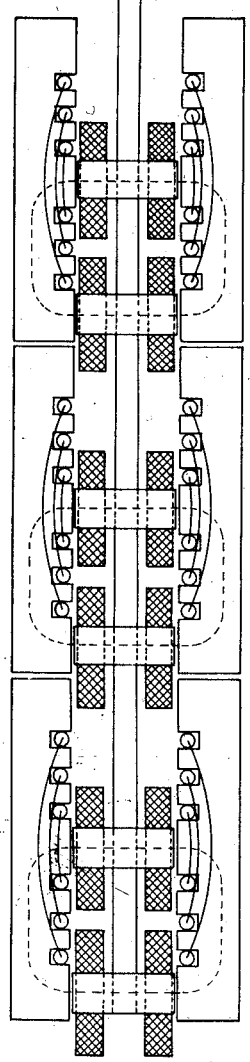
Figure 9:
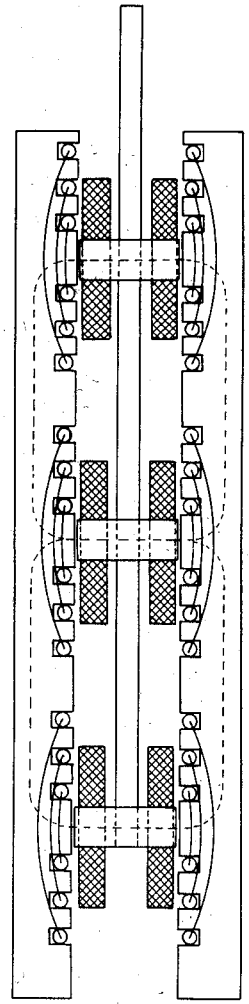

In the accompanying drawings I have shown some embodiments of my present invention, Fig. 1 being a diagrammatic view, partly in cross-section, showing the general construction of my new voltage regulating device in the form of a regulable transformer with a primary and a secondary winding; Fig. 2 a similar view, partly in cross-section, showing a modified construction of my voltage regulating device which may be considered as the inverted form of the construction shown in Fig. 1; Figs. 3a and 3b views showing some specific novel forms of one of said systems of core members at the poles thereof; Fig. 4 a diagram showing the connections for combining the regulating transformers shown in Fig. 1 or 2 and certain electrical operations of the so obtained combined system of regulating transformers; Fig. 5 a diagram of the connections for a modified construction of the transformer shown in Fig. 1; Fig. 6 a diagram showing the connections of my novel regulating transformer in the form of a choke-coil having a short-circuited secondary winding; Fig. 7 a diagram showing modified connections for a regulating transformer in the form of a choke-coil; Fig. 8 a view, partly in cross-section, similar to Fig. 1, showing a polyphase construction of regulating transformer; and Fig. 9 a similar view showing a modified form of construction of the polyphase regulating transformer of Fig. 8.

Referring more particularly to the drawings, the regulating transformer shown in Fig. 1 consists of two slide members $a_1$ and $a_2$ in the form of cores of magnetizable material, said slide members or cores carrying the secondary windings $b_1$ and $b_2$, and of two further slide members or cores $c_1$, $c_2$ carrying the primary windings $d_1$ and $d_2$ which are connected to generate a unitary magnetic flux as indicated in dotted lines in Fig. 1. In the under end position of the regulating transformer shown in Fig. 1 there will be generated an E. M. F. in one direction, while in the upper end position of said transformer there will be generated an E. M. F. in the opposite direction. According to Fig. 2 which shows the inverted construction of Fig. 1 the primary windings $d_1$ and $d_2$ are carried by the cores $c_1$ and $c_2$, while the secondary windings are carried by the core member $a$. The advantage of this construction consists in the smaller weight of the movable members. Also by arranging the convolutions of the primary and secondary windings in parallel relation to the paths of movement of the movable cores, a more compact assembly is obtained with greater assurance of a uniformly strong magnetic flux.

In order to attain a magnetizing current of greater uniformity, the centers of the two slide members or cores $c_1$ and $c_2$ shown in Fig. 1 may be arranged at a distance from each other which is different from the distance between the center lines of the poles of the companion slide members $a_1$ and $a_2$. A similar arrangement may be made in the construction shown in Fig. 2 and in addition, in both cases the same effect may be attained by staggering the slots for the secondary winding $b_1$ relative to the slots for the secondary winding $b_2$. In order to reduce leakage at the tips of the teeth intermediate the slots the poles of the cores $c_1$ and $c_2$ are preferably provided, as shown in Figs. 3a and 3b, with one or more slots $e$ which may be filled up with a non-magnetizable material.

In order to permit, in addition to regulating in phase, also a regulation in a direction perpendicular thereto, for each phase two regulating transformers of the aforedescribed kind may be used, the secondary windings $f$ and $g$ being in this case connected in series with each other and the primary windings supplied by E. M. F.'s of different phase, as shown, for instance, in Fig. 4. In this arrangement moveover, the E. M. F.'s are so chosen that the phases of two additional E. M. F.'s $r$ and $s$ are displaced against each other by 90° so that the vector of the resultant additional E. M. F.'s will move within the dotted square, the respective winding being properly dimensioned for this purpose.

The aforedescribed regulating transformers permit an even amount of regulation, both in positive as well as in negative sense. If it is desired to regulate in positive as well as in negative sense at different steps, according to Fig. 5 the core member which carries the primary winding may be provided with a secondary winding $k$ and the latter connected in series with the secondary winding $l$ on the other core member. By this there will be added a fixed step in front of the variable steps of regulation.

My present regulating transformer, besides for the purpose of voltage regulation with the several windings connected in various ways may also be used with advantage as a choke-coil without any regulating steps. For this purpose, as shown in Fig. 6 the secondary winding $m$ is short-circuited or closed upon itself and by adjusting the one core member with respect to the other the total self-induction of the apparatus may be varied within wide limits. A further improvement of this construction consists in providing on the core member which carries the primary winding a secondary winding $n$ which is connected in series with the secondary winding $p$ on the other core member, as shown in Fig. 7, thus providing a fixed preliminary step of regulation. Figs. 5, 6 and 7 show only the general principles of connections of this kind. If necessary, also one or more air-gaps may be inserted into the magnetic circuit, as may be easily understood by anyone skilled in the art.

It is furthermore possible to combine several single-phase regulating transformers shown for instance, in Figs. 1 and 2 to obtain a polyphase regulating transformer. In order to attain greater compactness of the construction of the last-mentioned kind, according to my invention the several single-phase transformers are arranged one on top of the other, as shown in Fig. 8. A construction of this kind also permit to use a rather simple device for mechanically adjusting the polyphase regulating transformer, the several slide members in this case being made up from laminated iron sheets passing throughout the length of the transformer.

The aforedescribed polyphase construction of regulating transformer may further be simplified, if the several single-phase transformers of which the polyphase transformer is composed are magnetically concatenated with each other. This may be done, for instance, in the manner shown in Fig. 9 by constructing the three single-phase transformers which are mounted one on top of the other only with three slide-members instead of six, said three slide-members being arranged at a distance in agreement with the center-lines of the three secondary windings and supplied each from one phase with the result that the magnetic fluxes set up in each phase will be concatenated with each other within said slide-members.

I claim:—

1. A voltage regulating transformer comprising two pairs of core members mounted slidably with respect to each other and adapted to provide an approximately closed single magnetic circuit for the passage of the flux of the magnetic lines of force therethrough, primary and secondary windings mounted respectively on the core members in each pair, and having their convolutions disposed in parallel relation to the paths of movement of the sliding core members.

2. A voltage regulating transformer as specified by claim 1, including yoke connections between the cores of the primary windings.

3. A voltage regulating transformer as specified by claim 1, comprising two transformer elements having primary and secondary windings, means for supplying alternating current of different phase to said primary windings, and connections for connecting said secondary windings in series with each other.

4. A polyphase regulating transformer comprising a plurality of transformers specified by claim 1, said transformers being each of the single-phase type and mounted one on top of the other.

5. A polyphase regulating transformer comprising a plurality of transformers specified by claim 1, said transformers being each of the single-phase type and mounted one on top of the other, the core-members forming part of each of said transformers being made from laminated sheet iron passing throughout the polyphase transformer so obtained.

6. A polyphase regulating transformer comprising a plurality of single phase transformers each having core members mounted slidably with respect to each other and adapted to provide an approximately close single magnetic circuit for the passage of flux of the magnetic lines of force through each single phase transformer, primary and secondary windings mounted respectively on said core members, and having their convolutions disposed in parallel relation to the paths of movement of the sliding core members, said single phase transformers being mounted one on top of the other, the core members forming part of each of said transformers, being made from laminated sheet iron passing throughout the polyphase transformers so obtained, there being only one core member for the primary winding of each single phase transformer and the primary core member of an intermediate positioned single phase transformer defining the return magnetic circuit of each of the two adjacent single phase transformers.

OSKAR LÖBL.